United States Patent [19]

Schenk

[11] Patent Number: 5,258,833
[45] Date of Patent: Nov. 2, 1993

[54] STERESCOPIC TELEVISION/VIDEO SYSTEM

[76] Inventor: Alan G. Schenk, P.O. Box 88J, Coffs Harbour Jetty, N.S.W. 2450, Australia

[21] Appl. No.: 860,898

[22] Filed: Mar. 31, 1992

[30] Foreign Application Priority Data

Apr. 8, 1991 [AU] Australia .............................. PK5461

[51] Int. Cl.$^5$ ...................... H04N 13/04; H04N 13/00
[52] U.S. Cl. ........................................ 358/88; 358/91
[58] Field of Search ............................ 358/88, 91, 92

[56] References Cited

U.S. PATENT DOCUMENTS

| | | | |
|---|---|---|---|
| 2,543,793 | 3/1951 | Marks | 358/88 |
| 3,184,630 | 5/1965 | Geer | 358/92 |
| 4,122,484 | 10/1978 | Tan | 358/88 |
| 4,214,257 | 7/1980 | Yamauchi | 358/92 |
| 4,717,949 | 1/1988 | Eichenlaub | 358/88 |
| 4,737,840 | 4/1988 | Morishita | 358/88 |
| 4,963,959 | 10/1990 | Drewlo | 358/88 |
| 5,028,994 | 7/1991 | Miyakawa | 358/91 |
| 5,049,987 | 9/1991 | Hoppenstein | 358/92 |
| 5,083,199 | 1/1992 | Börner | 358/88 |
| 5,084,763 | 1/1992 | Naradate | 358/91 |

*Primary Examiner*—Tommy Chin
*Assistant Examiner*—Bryan S. Tung
*Attorney, Agent, or Firm*—Jones & Askew

[57] ABSTRACT

A stereoscopic television/video system which provides true stereoscopic imaging without the use of glasses or other viewer encumbrances, and which is compatible with current storage, processing, pick-up, and broadcasting equipment as well as standard band-widths and formats, produces a composite video signal containing two images, which signal when received and displayed on a video display screen produces a manifestation containing two horizontally-disparate views of an object scene. Positioned at one of a set of mathematically defined loci in front of the video screen is a transparency consisting in vertically-oriented elements of two types: active elements which deviate light paths from the video screen, and passive elements which transmit light paths from the video screen to the viewer without deviation. The transparency by virtue of its positioning with respect to the video screen and because of the mutual alternation, width, respective light-redirecting properties, and spatial orientation of its elements, acts to optically and spatially dissociate the two-image manifestation such that each of the viewer's eyes can see but one of the simultaneously displayed images.

13 Claims, 8 Drawing Sheets

STERESCOPIC TELEVISION/VIDEO SYSTEM

This invention relates to the field of video imaging and more specifically to stereoscopic video imaging.

Because of the great informational value afforded an organism by stereoscopy, attempts have been made to produce a practical stereoscopic video imaging situation which does not require the use of spectacles or other such appurtenances. A 3D effect has been variously produced utilizing a method often referred to as frame sequential stereoscopy in which non-simultaneous alternate display to both eyes of multiple views is intended to provide clues to depth and produce a 3D effect.

As a take-off on changeable picture displays, such as might be found on post cards, stereoscopic imaging has been produced using a so-called lenticular or cylindric lens screen in conjunction with a video display consisting in interleaved vertical image stripes from two camera views. In that arrangement, over and usually in juxtaposition to the video screen is placed a cylindric lens screen consisting in vertically arranged contiguous cylindric lenses, the width of each such cylindric lens being essentially equal to that of one pair of contiguous vertical image stripes displayed on the video screen. This lenticular screen is aligned over the video screen so that each cylindric lens overlies a specific pair of adjacent image stripes on the video screen. The patent of Yamauchi (U.S. Pat. No. 4,214,257) is typical in this regard. The distance of the lenticular lens elements is equal to or about equal to the focal length of the cylindric lens elements and by refraction is intended to send light from each of the image stripe elements to the conjugate viewer eye. A viewing screen utilizing prismatic elements to directly substitute for the contiguous cylindric lens elements is described in the above-referenced patent.

Multiple-image video displays have been described using from one to five cameras, using "gratings of mutually extinguishing light filters" (Marks: U.S. Pat. No. 2,543,793), using alternate fields for right and left views, video difference signals, compression techniques, video display tubes with re-arranged or multiple electron guns, altered scanning circuitry, repositioned color trios, as well as simultaneous two-tube viewing, and holography.

Systems for stereoscopic video imaging that require the viewer to wear any kind of spectacles cause the viewer to be physically encumbered by such appurtenances and suffer a variety of possible inconveniences. Classical holography is incompatible with band-width requirements and existing video equipment. Frame sequential stereoscopy presents a situation which in unnatural to the viewer, as the views of an object scene are not presented simultaneously, and causes objectionable flicker, jump and blur in the foreground and background, and staggering of images. Systems claiming to produce stereoscopy from monoscopic image sources, do not work as claimed because a monoscopic view cannot be itself contain sufficient 3D information.

Cylindric lens screens and their systems are afflicted with poor optics and a narrowness of field for 3D imaging. Such cylindric lens systems depend upon contiguous lens elements to deviate light paths from the video screen to the conjugate eye of the viewer, and are essentially using the wrong optical element, as a prismatic element is the appropriate one to deviate light paths. Such lenticular systems are subject to off-axis aberrations as they depend essentially upon refraction to separate the video images for the viewer, and do not take advantage of available spatial considerations. Such systems correct poorly for non-planarity of video screens, and the prismatic elements described by Yamauchi are used directly to substitute for contiguous cylindric lenses and hence endure in use the same limitations.

Means for producing the vertical stripe element display on the video screen are varied. These involve a needless multiplicity of cameras, redundancy of scanning circuitry, excessive demands on existing bandwidths, necessary reorganization of phosphor elements in the video screen. Methods in which right and left vertical stripe elements are derived from alternating fields dedicated to respective views cause an eye to see its conjugate image only one half the time and therefore effectively discard fifty percent of the video information on the video screen.

The present invention utilizes the same general type of alternating interleaved vertical image stripe video display as used in cylindric lens systems but employs means to produce that display which are more facile and compatible with existing broadcast, storage, reception equipment. The present invention employs a transparency which is specifically positioned in front of the video screen, consisting in vertically oriented, equal-width elements of two kinds: active elements and passive elements which do redirect or do not redirect light paths respectively, and which alternate one type with the other such that active light-redirecting elements are non-contiguous with active elements; and that the transparency elements by virtue of their positioning, width, respective light redirecting properties and mutual alternation act together to optically dissociate the two-image video display for the viewer into its component horizontally disparate images. Non-contiguous active elements in the transparency are essentially prismatic rather than lenticular.

The present invention consists in a stereoscopic television system comprising:

means for producing a composite two-image video screen display in which vertical stripe elements from each of two horizontally disparate views of the same object scene are taken and displayed on a video screen such that those elements from one view alternate contiguously across the horizontal width of the video display screen with those elements from the other view, and that those vertical stripe elements taken from one view constitute an image of that view and those vertical stripe elements taken from the other view constitute an image of that other view, together forming a composite two-image video display; and, a transparent screen, specifically positioned between the video display screen and the viewer, the said transparent screen consisting in vertically oriented elements of equal horizontal width, the said elements being either passive elements which pass light from the video display screen to the viewer or active elements which act to redirect light emanating from the video display screen.

passive and active elements alternating in space across the horizontal width of the screen, so that active elements are non-contiguous with active elements and passive elements are non-contiguous with passive elements, said screen elements, by virtue of their positioning, width, respective light-redirecting properties and mutual alternation acting together to optically dissociate the composite two-image video screen display into its two component horizontally disparate images such that in use each of said images is perceived by only one of a viewer's two unaided eyes.

The present invention further consists in a method of creating a composite two-image video display consistent with the stereoscopic television system as claimed in claim 1, in which method two gratings are used with two lens systems and one image pick-up device, the two gratings being similar, vertically oriented gratings having opaque elements separated by spaces equal in width to the width of those opaque elements, each of two similar but horizontally disparate lens systems being focused on the same object scene and feeding into the image pick-up device, each of the two gratings being placed in each lens system so that it is situated in the image plane of a first part of the lens system and simultaneously in the object plane of a second part of the lens system whereby each complete lens system with grating produces an image of an original object scene having superimposed thereon an image of the respective grating, each of said images from each lens system being superimposed optically upon the other of said images and horizontally offset in a manner such that vertical stripe image elements of one view alternate contiguously with vertical stripe image elements of the other view thus forming a composite two-image manifestation which is then inverted/reverted and focused on the target plate of the image pick-up device for display on a video display screen, the pitch of the grating elements being chosen to produce on a video display screen vertical image stripes compatible with color phosphor stripes or similar elemental width on a flat panel display, being a whole number multiple of that elemental width of the display screen.

The advantages of this invention are numerous and significant. It provides a situation for stereoscopic imaging which does not physically encumber the viewers with spectacles, does not depend upon experiential knowledge, suppression, or non-stereoscopic depth clues. It produces no detectable image flicker. Because cylindric lens system essentially utilize lenticular elements to deviate light paths, they are subject to severe field restrictions and image degradation in off-axis viewing situations. The most appropriate optical element for deviating light paths is the prism and only in the present invention is it used to best advantage to provide a wide field of view for stereoscopic imaging.

It is a system which does not require changes to the internal circuitry of existing cameras or video display devices, and does not depend upon video difference signals or compression techniques in transmission. And that it requires only two cameras and one display screen it is efficient and cost effective. The system of the invention is compatible with currently produced image pick-up devices as well as transmission, storage, processing, and reception technologies, as well as computer-generated imaging situations.

In one form of the invention the non-contiguous active elements are each singular prisms lying essentially in the plane of the transparency and interspaced by passive, non-light-redirecting elements. In another form of the invention, each of the above singular prisms is replaced by a pair of fellow, oppositely acting prisms. And in still another form of the invention, each of the pair of fellow prisms is replaced by a pair of similar fellow prisms but each of which is set at an angle in front of or behind the plane of the transparency. In any of the forms of the invention cylindric lens elements can be added to active or passive elements to shape light paths to the viewer through them, but these cylindric lenses are not used to deviate those light paths from one eye to the other as they are in cylindric lens systems of prior art.

To assist in an understanding of the invention, reference will be made to the accompanying drawings.

Figure 3:
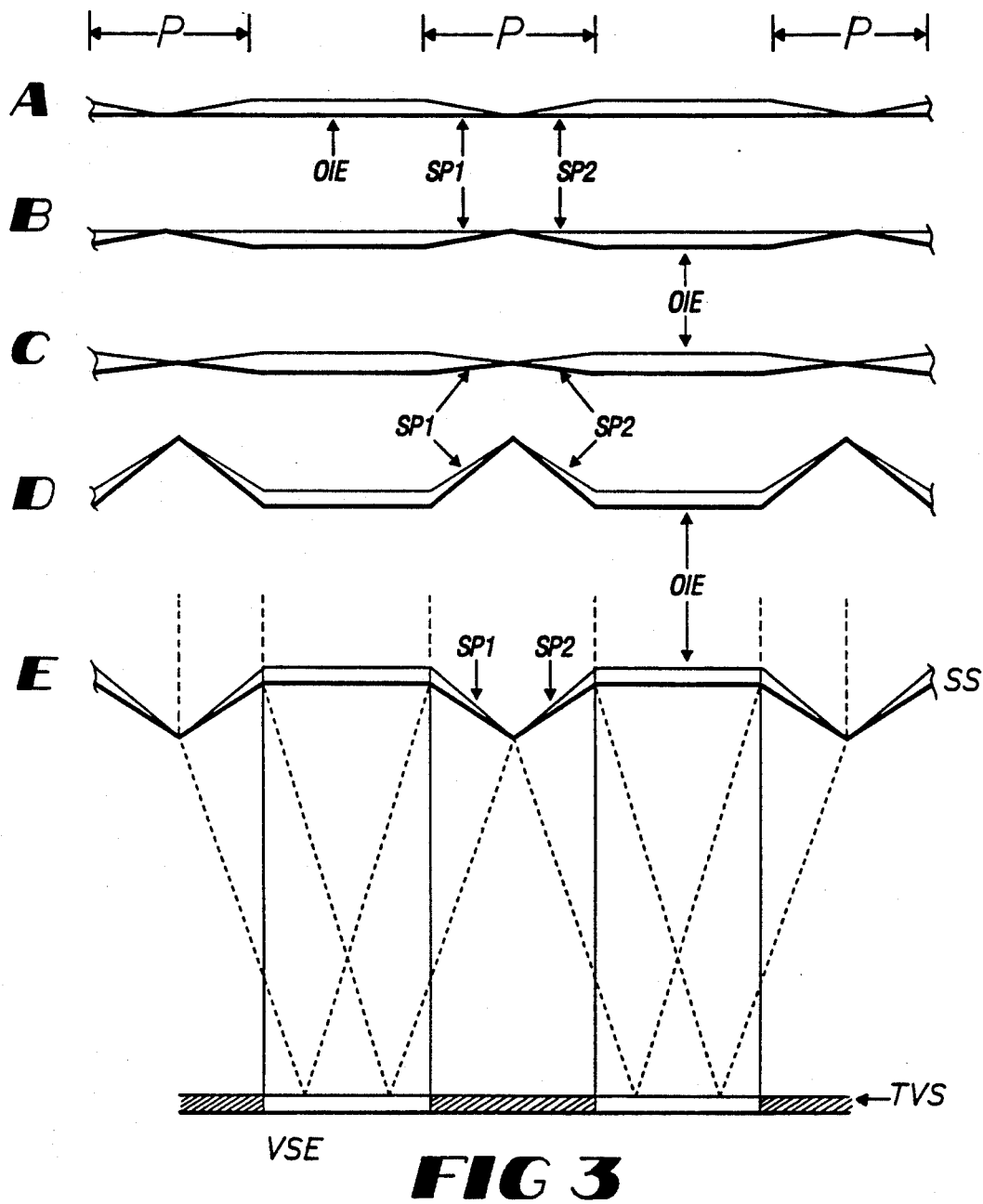
Figure 4:
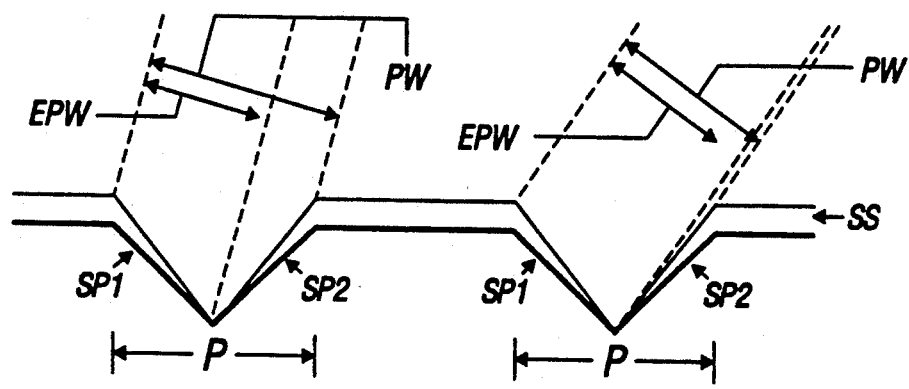
Figure 5:
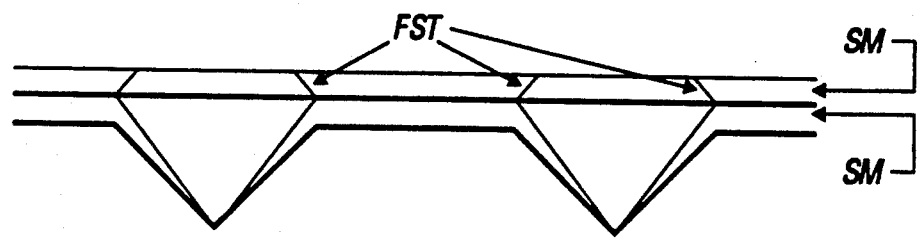
Figure 6:
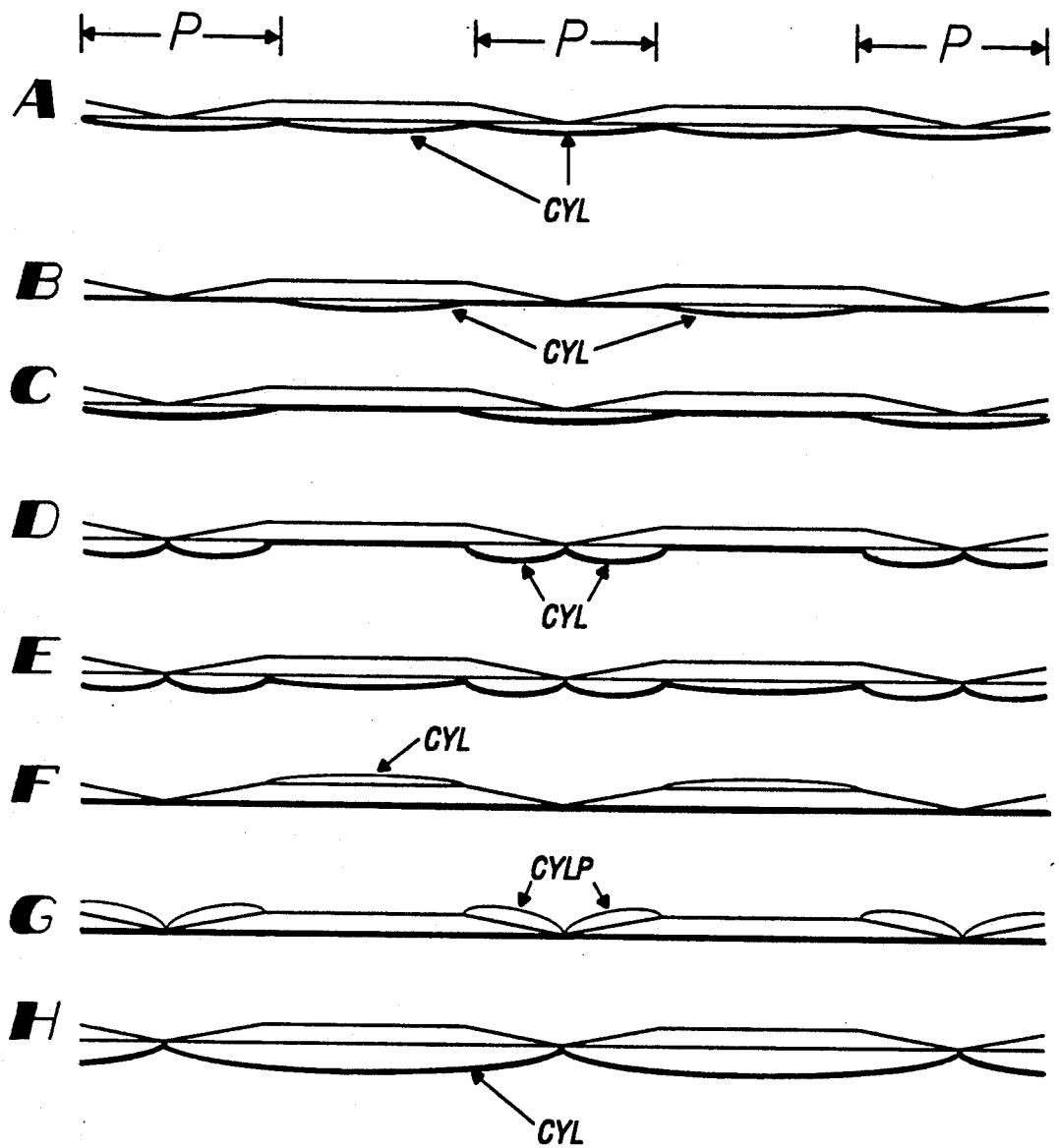

FIGS. 3A, B, C, D and E illustrate alternate embodiments of the invention;

FIG. 4 shows relative contributions of prismatic elements in FIG. 3E to stereoscopic image in off-axis viewing;

FIG. 5 depicts a possible configuration of a supporting member and spatially-oriented f-stops which can be employed;

FIG. 6 illustrates the general manner in which cylindric lenses can be incorporated into the system as deemed desirable to sculpt the boundaries of light paths through the screen.

Figure 7:
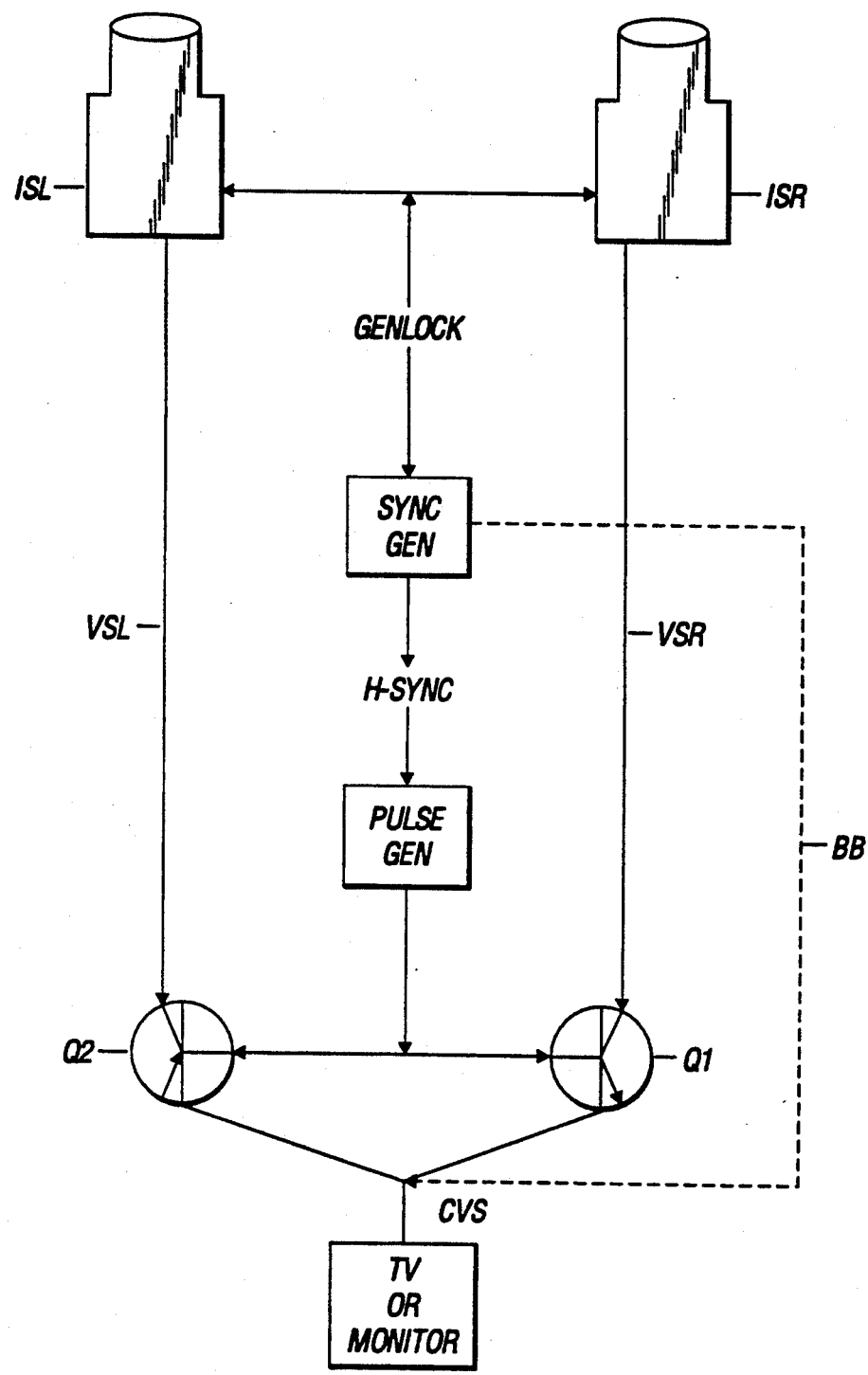
Figure 8:
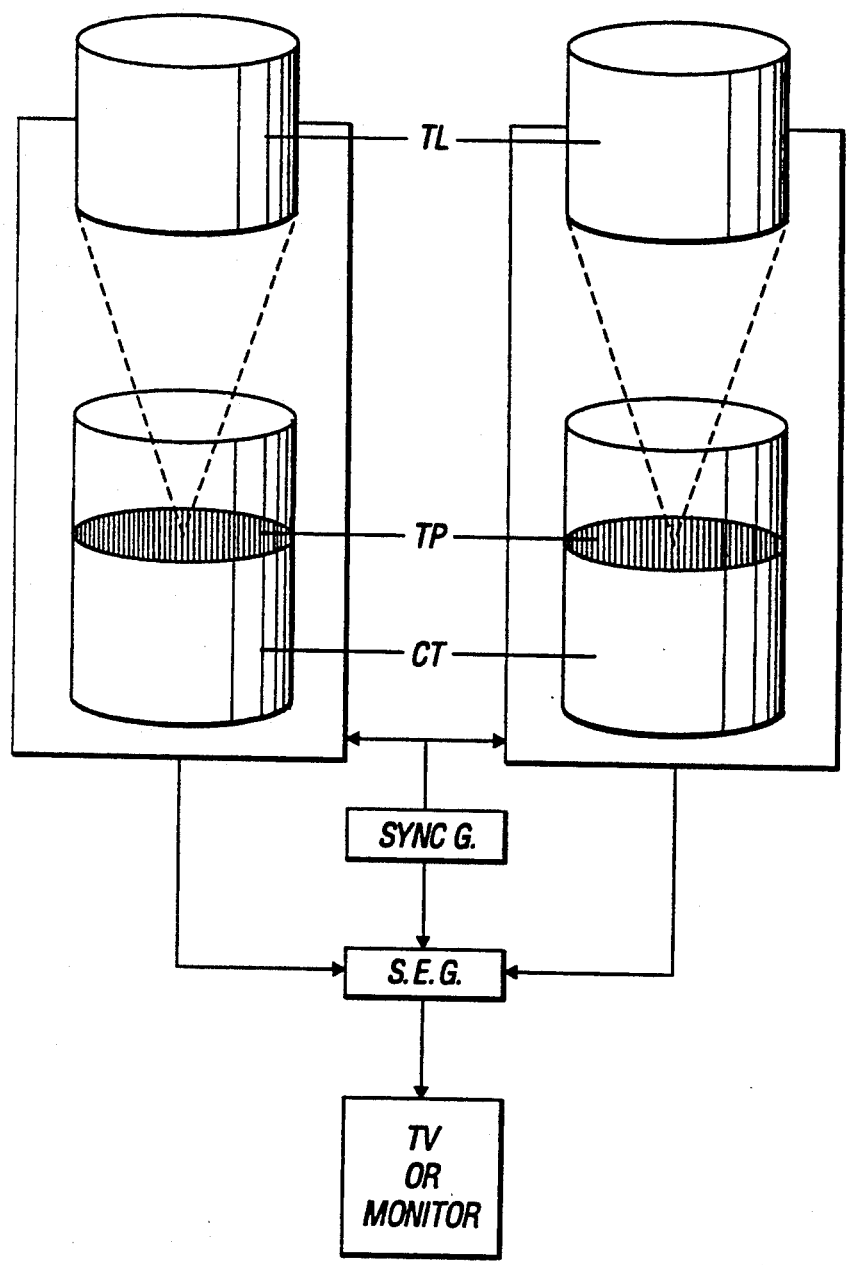
Figure 9:
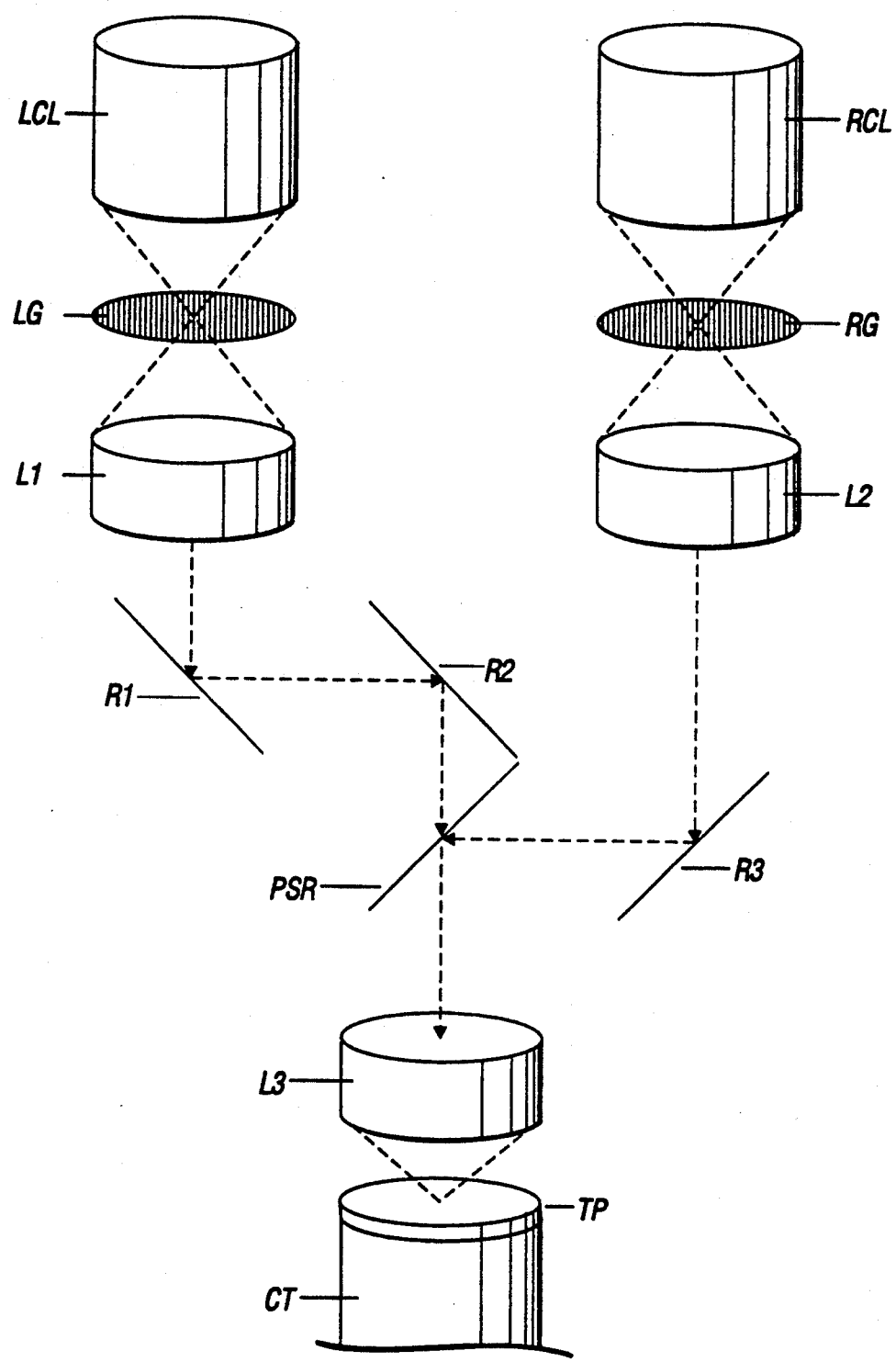

FIG. 7 shows an electronic means for generating the composite two-image video screen display;

FIG. 8 illustrates diagrammatically an alternate optical/electronic means for producing the display screen image;

FIG. 9 illustrates diagrammatically an alternate optical means for producing the display using two opaque offset gratings and one image take-up device.

Unless otherwise noted, certain assumptions have been made in the construction of the diagrams to simplify and facilitate representation. It is assumed that the video screen is planar, that a vertical plane through the nodal points of the eyes is parallel to the video screen, that the viewer is healthy and at the usual optimal distance from the screen, and that the distance is measured perpendicularly to the video screen.

Figure 1:
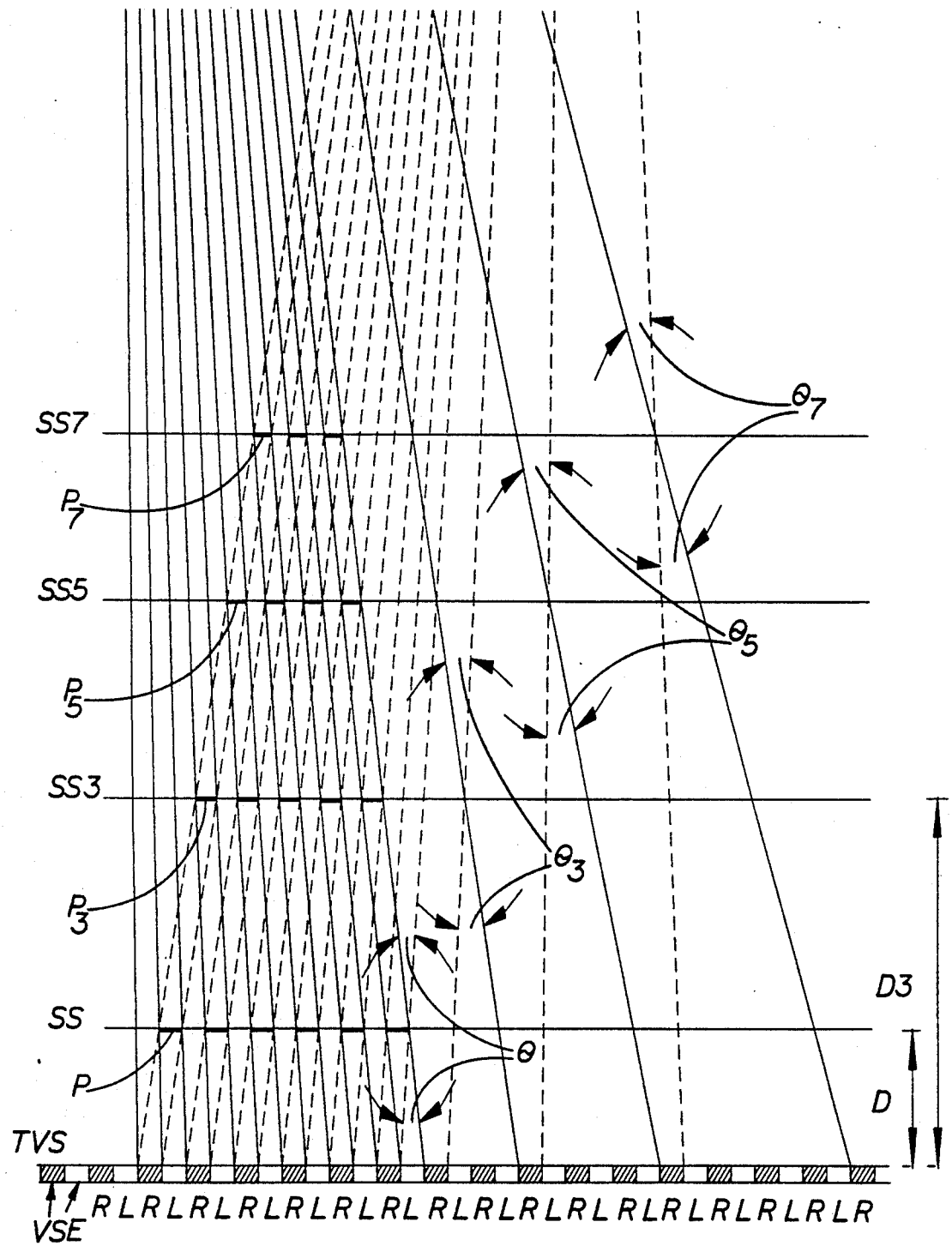
FIG. 1 illustrates the underlying spatial principle utilized in the invention.

In FIG. 1 a cross-section through a video screen TVS and the viewer is taken, although the viewer is not shown but is located at a distance above the video screen above the picture. Solid angled lines from the TVS represent light rays from the TVS to the viewer's right eye, while broken lines are rays to the left eye. Displayed on the video screen are vertical stripe elements VSE of equal width, with alternate ones of these containing video information intended to be seen only by either the right eye or the left eye. These vertical stripe elements are marked with R or L to signify their image content and the conjugate eye to which light from each should travel, and also are blackened or whitened for clarity of presentation. Between the viewer and the video screen there exist in space unique, specific surfaces represented here in cross-section by the vertical lines labelled SS or SS3, SS5, etc., at distance D, D3, D5, etc., from the video screen. These surfaces have the characteristic that, as drawn, the angle formed at a point on said surfaces by the converged visual axes of the eyes is equal to the same angle $\theta$ subtended at the same surface by the width of one VSE or odd whole-number multiple of that width. The surface SS, for example, is situated in space such that the angle θ between the converged visual axes is the same angle θ subtended at that surface by the width of one vertical stripe element on the video screen. For the surface SS3 the angle θ3 is that subtended by the converged visual axes and also by the width of three vertical stripe elements on the video screen. Similarly for higher order surfaces SS5, SS7, etc. The surfaces shown are planar only because the depicted video screen is flat, and will necessarily be non-planar with non-planar video display screens.

It can be seen that the light rays to either eye emanating from the edges of the vertical stripe elements on the display screen act to naturally divide each of these surfaces into equal width segments. The width of each segment at any particular surface subtends at either of the viewer's eyes an angle equal to that subtended at either eye by one VSE on the video screen. For surfaces SS, the width of each of the above said segments is by proportional triangles less than the width of a TVS vertical stripe element but greater than the width of similar segments in SS3, while the segments at each surface nonetheless subtend at either of the viewer's eyes the same angle as is subtended by the width of one VSE on the video screen. And likewise, the width of such sections in surfaces at progressively greater distances from the TVS is progressively less with regard to the width of a VSE on the display screen. Alternate sections at each surface have been darkened and labelled P, P3, P5, etc. These are to be understood as being optical elements and are given the property of being able to deviate the paths of light emanating from the TVS (which paths would otherwise send non-conjugate image information to the inappropriate viewer eye) to, instead, the eye for which such information is intended.

For a particular surface it can be appreciated that either eye is able to view directly, through the spaces between the optical elements, those vertical stripe elements on the video screen containing image material intended for viewing by that eye. Whereas the optical element in each alternate section acts to redirect light rays such that every alternate VSE, containing image material not intended for viewing by the respective eye is not visually available to that eye but replaced optically by image material intended for viewing by that eye. Hereinafter, the above described surfaces (SS, SS3, SS5, etc.) will be referred to as stereoptic surfaces and those surfaces containing spaced, non-contiguous optical elements as stereoptic screens, with the understanding implicit that the relationships described heretofore pertain.

Figure 2:
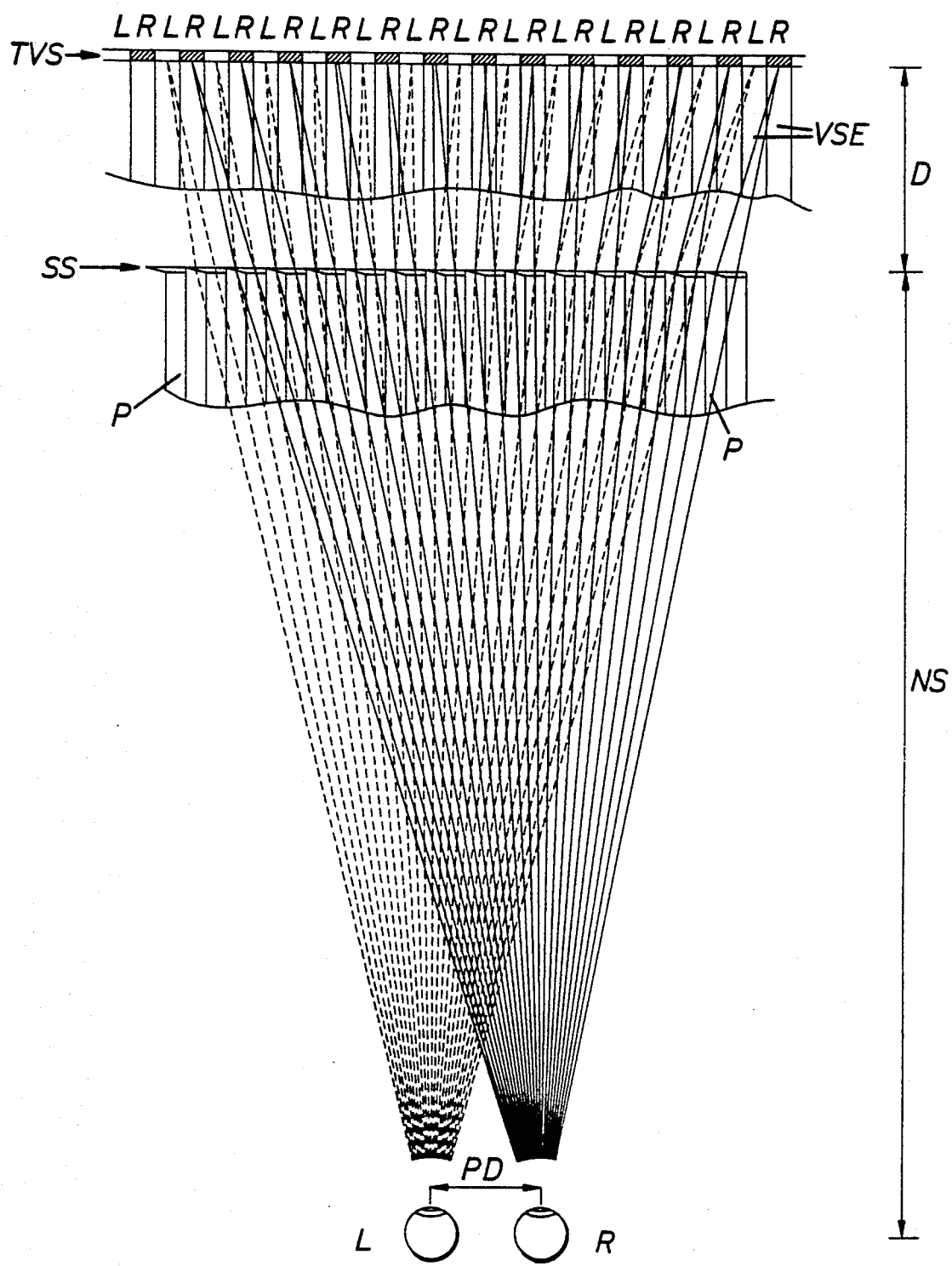
FIG. 2 is a diagrammatic representation of the principles set forth in FIG. 1 in the simplest practical use configuration.

Reference is made to FIG. 2 which depicts diagrammatically a representation of the above-elucidated principles in a typical-use situation employing in this instance a first-order stereoptic screen, although higher order stereoptic screens can as readily be used. The video screen TVS is located at the top of the figure and displays vertical image stripe elements VSE, with each alternate one containing video information intended for viewing by only the right eye or the left eye, as is indicated by the R and L labelling. The stereoptic screen SS is located in front of the video screen at a distance D from that screen and at a distance NS to a plane containing the viewer's eyes which are separated by an interpupillary distance PD. Relative distances and elemental widths are accurately proportioned but, for diagrammatic purposes, have been made such as to be contained within the figure. In a typical use situation the distance D would perhaps be slightly more than an inch whereas the distance NS would be just under eight feet.

The stereoptic screen in the figure contains vertically oriented, non-contiguous alternate sections with horizontally-acting singular prismatic elements acting here as the active, light-redirecting optical elements. The non-light redirecting, equal width intervening spaces between the prismatic elements are here depicted as being parallel plane surfaces having only structural, supporting value, but may be spaces devoid altogether of solid material. Similarly, the space between the video screen and the stereoptic screen may be occupied by air or solid material.

Light rays to the right eye are depicted by solid lines while those to the left eye are depicted as broken, dashed lines. The solid lines to the top of the picture on the right show the path of light from R-labelled VSE's to the viewer's right eye, whereas the dashed lines to the left of the picture show the path of light from the L-labelled VSE's to the left eye. In the center of the figure both sets of rays are drawn to illustrate the manner in which the system herein described separates the composite two-image video display into right and left images which are available only to the proper conjugate eye of the viewer. The depicted prismatic elements can be formed on the front surface of the transparency, on the back surface, or can be effected as through the use of compound prisms. It is to be noted that if the relationships in the system are altered, as for example, in moving the stereoptic screen towards or away from the video screen, the peculiar phenomenon of stereoscopic imaging does not occur.

It can be appreciated from FIG. 2 that each active, light-redirecting optical element P together with its adjacent inactive, non-light-redirecting space can be used with a multiplicity of vertical stripe elements on the video screen with different viewing angles. Stereoscopic imaging is therefore available to the viewer over a wide field of view. Specifically, if the viewer moves to his right or left by a distance equal to twice his interpupillary distance PD, or some multiple thereof, proper stereoscopic imaging is optimal. The system of this invention depends upon spatial relationships as well as refractive elements.

In the foregoing description of the stereoptic screens, each active vertically oriented light-redirecting optical element was depicted as a singular prism. In another form of this invention, this singular prism is replaced by an equal width pair of fellow prisms, each occupying only one half the horizontal width of the singular prism, acting horizontally to redirect a complementary portion of the light rays passing through the optically active elements in the stereoptic screen.

FIG. 3 depicts five different configurations of these pairs of fellow prisms, which may be considered representative. In the figure, P refers as before to the active optical elements while SP1 and SP2 refer to each of the smaller prisms in each pair. OIE refers to the optically inactive 'spaces' in each stereoptic screen separating spatially the active elements. In part A of the figure the prismatic elements are formed on the front surface of the transparency; in B, on the back surface; and in C, by a combination of both front and back surfaces. In part D of the figure, the fellow prisms are angulated in space forward out of the plane of the stereoptic screen per se, and in Part E are angulated backwards towards the video screen. Brief reference is here made again to FIG. 1 to point out that each darkened line section (P, P3, P5, etc) is contained in space by a rhomboid-like cross-sectional space. In axial viewing the space is large, and decreases in size with greater eccentricity of viewing. This space indicates the limits in which optical elements must remain so as not to interfere with stereoscopic viewing, but also indicates the working space available to optical elements there placed. Embodiments D and E of FIG. 3 maximize the use of this space.

Part E of FIG. 3 illustrates the general manner in which light paths are operated upon by the active and inactive elements in the stereoptic screen. Those paths represented by solid lines pass through the optically inactive spaces between prismatic elements and are undeviated in their course to the viewer, whereas those paths passing through prismatic elements are deviated such that video screen image material intended for an eye are deviated from an orthogonal path to the nonconjugate eye to a path to the proper conjugate eye.

FIG. 4 is a further elucidation of the manner of function of the angulated fellow prisms in Parts D and E of FIG. 3 for eccentric viewing angles of the viewer. In slightly eccentric viewing situations the path width to a viewer's eye (PW) which passes through an active optical element in the screen SS is depicted on the left half of FIG. 4. The proportion of the path through P which passes through SP1 becomes larger as EPW increases, while the proportion of the total path width PW passing through SP2 decreases. With greater viewer eccentricity, the proportional contribution EPW to PW by SP1 increases further while that through SP2 decreases further, with the effect that the contribution of SP2 to the light passing through the active optical element in the screen to one of the viewer's eyes is effectively "stopped out" of the optical system by virtue of its orientation in space. This leaves SP1 to contribute the primary means constituting, in off-axis viewing situations, the effective path width EPW. In this manner, the property of prisms to decrease in effective power with symmetrical viewing through them is combined with prism orientation to flatten the curvature of image field and widen the practical field for viewing in front of the video screen.

Any of the basic embodiments of the invention can be used in conjunction with or incorporate cylindric lens elements to shape the light paths through the stereoptic screen by sculpting their respective boundaries, and so increasing positional tolerances for the viewer. FIG. 6 depicts the general nature in which such cylindric lens elements can be employed, here showing utility with embodiment A in FIG. 3, but equally applicable to the other embodiments of the invention. P represents, as priorly, a prismatic element in the screen, while CYL indicates cylindric lens elements. These cylindric lens elements: can be used with prismatic elements, or with inactive elements, or with both prismatic and inactive elements in the screen; can be employed in front of or behind the basic embodiment of the invention; can be incorporated into the stereoptic screen as separate in configuration from the prismatic and/or inactive elements, or such as to consist in an integral configurational unit. FIG. 6G illustrates the manner in which a cylindric lens element can be incorporated into a prismatic element to constitute a single "cylindro-prismatic element, CYLP, which does basically function as a prism but allows additionally for the vergence of the light path therethrough to be adjusted as deemed desirable to shape the boundaries of the light path to better define the basic light field pattern established by the system of the invention for 3D viewing. It is to be emphasised, however, that the use of such cylindric lenses in conjunction with prismatic or with inactive elements in the screen, is to shape light paths and not to deviate those light paths from one viewer eye to the other viewer eye, in contradistinction to prior art use.

If the stereoptic screen is constituted in the form of a thin plastic transparency, additional plastic material may be added to such transparency for purposes of support. FIG. 5 illustrates a possible such arrangement of stereoptic screen SS with a supporting member SM. Also, if linear opacities are incorporated into the supporting member, as depicted by FST labelling, these linear opacities can function as general f-stop mechanisms to stop out SP2 contribution to the optical system in eccentric viewing situations.

Means for producing the composite two-image display utilizing two horizontally disparate cameras and electronic means for multiplexing the two signals will now be presented.

Reference is made to FIG. 7 which illustrates schematically the basic electronic components needed to produce a two-image composite display compatible with the previously described optical system for viewing. Block components are depicted and no attempt is made to dissect out specific circuitry.

ISR and ISL represent horizontally disparate cameras focused on the same object scene and producing signals VSR and VSL. NTSC format is here assumed, though the method is equally applicable to other formats. ISR and ISL may also be other video image sources such as time-base-corrected video tape recorders, etc. Each of the cameras is synchronized as through a Genlock arrangement by a video sync generator (SYNC GEN) which also outputs an H-sync signal. This H-sync signal is delivered as input to a pulse generator and functions as the trigger signal for the pulse generator which has trigger delay and gating capability. Upon triggering by the H-sync impulse, the pulse generator delays output such that its output begins at the end of the H-sync back porch and the beginning of the transmission of the video information specific to the horizontal line in the raster which is being scanned. The pulse generator outputs a DC square wave which continues until arrival of the next H-blanking interval. This square wave is of a voltage capable of driving complementary NPN/PNP transistors Q1 and Q2, or other electrical switching means. A variable emitter bypass circuit can be added to the square wave output to enhance square wave characteristics in order to improve multiplexing. The square wave output of the pulse generator is fed to the bases of the complementary transistors such that during each horizontal scan the throughput to the receiver of the clamped camera signals VSR and VSL is regulated by the square wave voltage and effectively alternated to produce a composite video signal CVS containing alternating packets of information from each of said signals. The synchronizing signals per se (Black Burst BB) can be added to the composite video signal as required.

The electrical switching means described above can be accomplished in manners other than that described, but such methods do not detract from the essence of the invention. Alternatively, the video information in each horizontal line from each video source can be digitalized and temporarily stored in memory and alternating packets of this video information can be retrieved and utilized to constitute the vertical stripe elements by virtue of their memory locations. This utilization of packets of information is ultimately based, however, on the time period elapsed relative to the horizontal sync and is described by the square wave output of a pulse generator as described above.

The frequency of the pulse generator determines the width of the VSE's and the width of the VSE's is chosen so as to be compatible with the width of the colour stripe trios on the video screen (viz., VSE width equal to the width of the colour stripe trios or a whole number multiple of that width), or to be similarly compatible with pixel width on a flat panel display screen.

In another form of the invention as relates to the means for production of the composite video signal, reference is made to FIG. 8 which shows schematically two cameras with lens systems TL, image pick-up tubes CT, and tube target plates TP. It is to be understood that the cameras may have one tube each, a three-tube array, or be charge coupled devices. The cameras are horizontally disparate, are focused on the same object scene and are synchronized by a sync generator (SYNC GEN), the latter which may or may not be incorporated into the special effects generator (SEG). Identical, vertically oriented gratings, consisting in opaque elements separated by spaces equal in width to that of the opaque elements, are incorporated into the target plates of the pick-up tubes or are in apposition thereto within the image planes of the camera lens system. The vertical gratings are positioned similarly in the two cameras as described except that one grating is offset horizontally with respect to the other by an amount equal to the width of one opaque grating element. An effective offset can be alternatively accomplished electronically. Each camera produces an image consisting in vertical stripe elements alternating with dark spaces corresponding to the opaque elements in the gratings, and because of said horizontal offset, the superimposition of these two images produces a composite two-image manifestation which has vertical stripes from one camera alternating with vertical stripes from the other camera. The black levels of the signals are clamped, and the signals processed through the SEG for superimposition. The resultant composite video signal is then transmitted normally to a receiver or other display device such as a video monitor or flat panel display. It is to be noted that the width of the vertical stripe elements on the display device is determined by the width of the grating elements, and that in order not to interfere with proper color rendition that width is specifically chosen, as equal to the width of one color stripe trio or a whole number multiple thereof.

In another form of the invention as relates to means of production of the composite video signal, reference is made to FIG. 9. Depicted is a camera tube CT with its target plate TP and the separate right and left lens arrays RCL and LCL which feed into the camera tube, which may represent any image pick-up device. The two lenses, RCL and LCL, have similar design, and are horizontally disparate, and focused on the same object scene. RG and LG represent similar, vertically oriented gratings having opaque vertical elements of a width equal to the spacings between those elements. L1, L2, L3 are lenses; R1, R2, R3 are reflectors (mirrors or prisms); PSR is a partially silvered mirror or 50/50 prismatic beam splitter or other such device. Gratings RG and LG are positioned in the image planes of LCL and RCL, and at the same time in the object planes of L1 and L2, respectively. The images formed by L1 and L2 therefore consist in vertical stripe elements of the original object scene from respective horizontally disparate taking lenses, interspaced by equal-width shadows from overlaid opaque grating elements. The vertically striped images formed by L1 and L2 are then reflected by reflectors such as R1, R2 and R3, and superimposed one on the other by a device such as the half-silvered mirror PSR such that the image stripes of one image of the object scene alternate contiguously with the image stripes of the other, thus forming a composite two-image manifestation. This manifestation is then acted upon by L3 to be focused on the target plate TP of pick-up device CT, or comparable level in a charge coupled device. The composite image can be inverted/reverted by L3 or by other lenses or roofed prisms at any other appropriate point in the system. It is to be understood that the particular configuration of lenses, reflectors, and superimposition means may be varied in form without detracting from the essence of the invention. The pitch of the grating elements is chosen, as previously described, to produce the desired width vertical stripe elements displayed on the video screen so as to be compatible with the width of pixel elements or color phosphor trios in the screen.

I claim:

1. A stereoscopic television system comprising:

means for producing a composite two-image video screen display in which vertical stripe elements from each of two horizontally disparate views of the same object scene are taken and displayed on a video screen such that those said vertical stripe elements from one view alternate contiguously across the horizontal width of the video display screen with those said vertical stripe elements from the other view, and that those said vertical stripe elements taken from said one view constitute an image of that said one view and those said vertical stripe elements taken from the other view constitute an image of said other view, together forming said composite two-image video display; and, a transparency positioned between said video screen and a viewer to occupy a locus of points such that lines from each of the viewer's eyes to said video screen intersect at points on said locus and include at said locus an angle subtending at the video screen the width of one of said vertical stripe elements, or the width of a whole odd-numbered plurality of said vertical stripe elements, said transparency consisting of vertically oriented sectional elements, each of said sectional elements having width such that the width of each said vertical stripe element on said video screen measures at an eye of the viewer an angle which subtends at said locus of points the width of one of said sectional elements, the said sectional elements being of two kinds, passive sectional elements and prismatic sectional elements, said passive sectional elements and said prismatic sectional elements alternating in space across the horizontal width of the transparency such that said prismatic sectional elements are non-contiguous with other of said prismatic sectional elements and said passive sectional elements are non-contiguous with other of said passive sectional elements, said passive sectional elements acting to transmit light passively in a straight line from said video screen to said viewer such that in use essentially only alternate said vertical stripe elements displayed on the video screen can be seen through said passive sectional elements by either one or the other of the viewer's eyes, said prismatic sectional elements acting in a horizontal plane and in the manner of prisms to deviate at said locus of points light from said video screen such that in use essentially only alternate vertical stripe elements which can be seen by an eye of the viewer through said passive sectional elements can be seen by said eye through said prismatic sectional elements.

2. A stereoscopic television system according to claim 1 in which each of the prismatic sectional elements in the transparency consists of a single prism.

3. A stereoscopic television system according to claim 1 in which each of the prismatic sectional elements in the transparency consists of a unit pair of fellow prisms, adjacent one to the other, such that the apex of one of said unit pair of fellow prisms abuts substantially on the apex of the other of said unit pair of fellow prism.

4. A stereoscopic television system according to claim 3 in which the greatest horizontal dimension of said unit pair of fellow prisms is given width such that the width of each of said vertical stripe elements on said video screen subtends at an eye of the viewer an angle which subtends as said locus of points the greatest horizontal dimension of said unit pair of fellow prisms.

5. A stereoscopic television system according to claim 3 in which said unit pair of fellow prisms is positioned such that the unit pair's greatest horizontal dimension lies within said locus of points.

6. A stereoscopic television system according to claim 3 in which each of said fellow prisms in the unit pair acts horizontally to deviate light from the video screen in a direction divergent from the direction of light deviated by its fellow prism such that, in use, essentially only alternate said vertical stripe elements displayed on the video screen can be seen by either one of the viewer's eyes.

7. A stereoscopic television system according to claim 3 in which the spatial orientation of each of the prisms in the unit pairs is such that, in use, with increasing viewer eccentricity in off-axis viewing, the effective power of one of the prisms in each said unit pair decreases as its contribution to the three dimensional image increases, simultaneous with the decreasing contribution to the system of its fellow prism whose effective power is increasing.

8. A stereoscopic television system according to claim 1 in which the prismatic sectional elements are constituted by configurations of material on a front surface, a back surface, a combination of both said front surface and said back surface, or by a combination of the material configurations to constitute a compound unit, whether superficial to or contained partially or wholly within a sheet of matter.

9. A stereoscopic television system according to claim 1 in which the passive sectional elements of the transparency consist in spaces devoid of material or in regions of a clear sheet or plate which regions consist substantially of plane parallel surfaces.

10. A stereoscopic television system according to claim 1 in which cylindric lens elements are added to or used in combination with said prismatic sectional elements or said passive sectional elements to shape light paths traversing said prismatic sectional elements or said passive sectional elements in said transparency.

11. A method of creating a composite two-image video display consistent with the stereoscopic television system in claim 1 in which method two gratings are used with two lens systems and one image pick-up device, the two gratings being similar, vertically oriented gratings having opaque elements separated by spaces equal in width to the width of said opaque elements, each of two similar but horizontally disparate lens systems being focused on the same object scene and feeding into the image pick-up device, each of the two gratings being placed in each said lens system so that it is situated in the image plane of a first part of the lens system and simultaneously in the object plane of a second part of the lens system whereby each complete said lens system with one of said gratings produces an image of an original object scene having superimposed thereon an image of the other respective grating, each image from each said lens system being superimposed optically upon the other image and horizontally offset in a manner such that image stripes of one view alternate contiguously with said image stripes of the other view thus forming a composite two-image manifestation which is then inverted/reverted as required and focused on the target plate of the image pick-up device for display on said video screen, the pitch of the grating elements being chosen to produce on said video screen said vertical stripe elements compatible with color phosphor stripes of similar elemental width or a flat panel display, and being a whole number multiple of said elemental width of the video screen.

12. A method of producing a composite two-image display in which two cameras or other video sources are used in conjunction with electronic means to produce said display, wherein, each of two similar but horizontally disparate cameras is focused on the same object scene and synchronized one with the other by a synchronization signal generator, a pulse generator being triggered by an H-sync pulse from the synchronization signal generator and producing a grated square wave output, said square wave output being used to control mutually alternating electrical switching means in each of said cameras' signal lines to cause the alternate flow of video information packets in each of the signal lines during each horizontal scan line, said video information packets from the signal line of one of said cameras alternating with each of said packets from the signal line of the other of said cameras to produce in one common signal line an electronic signal which when fed to a video receiver produces a composite vertically striped two-image manifestation, the frequency of the square wave output of the pulse generator determining the width of vertical stripe elements displayed on the video screen, said width being chosen so as to be compatible with a color phosphor trio or similar elemental width on a flat panel display, and being a whole number multiple of said elemental width of the video screen.

13. A method of producing a composite two-image video display, which display is consistent with the stereoscopic television system in claim 1, and in which two similar horizontally disparate cameras are used with two vertically oriented gratings, the two similar horizontally disparate cameras being synchronized and focused on the same object scene, one of said two similar gratings having opaque said vertically oriented elements separated by spaces equal in width to that of the opaque elements being placed within each of said cameras in the image plane containing a target plate of the camera, each of said gratings being positioned so that one grating is, with respect to the image pick-up device, physically or electronically offset horizontally from the other by the width of one opaque grating element, the resultant electronic images being superimposed one upon the other through such means as a special effects generator to produce a composite signal which when displayed on said video screen of a television receiver consists of said vertical stripe elements from one horizontally disparate view alternating with said vertical stripe elements from the other view, the width of the grating elements and their intervening spaces being chosen to produce a width of the displayed vertical stripe elements which is compatible with color phosphor stripes or similar elemental width on a flat panel display, and being a whole number multiple of said elemental width.

* * * * *